United States Patent [19]

Carroll

[11] Patent Number: 4,527,073
[45] Date of Patent: Jul. 2, 1985

[54] SHIELDED ELECTRICAL CABLE SYSTEM

[76] Inventor: William R. Carroll, 8100 University Dr., Richmond, Va. 23229

[21] Appl. No.: 554,217

[22] Filed: Nov. 22, 1983

[51] Int. Cl.³ .......................... H04B 3/28; H03H 11/44
[52] U.S. Cl. ........................................ 307/90; 361/43; 333/12; 333/217
[58] Field of Search .......................... 307/89, 90, 103; 179/170 G, 170 R, 174; 333/12, 213, 216, 217; 174/36; 361/111, 43

[56] References Cited

U.S. PATENT DOCUMENTS

| | | | |
|---|---|---|---|
| 3,674,933 | 7/1972 | Baum et al. | 307/90 X |
| 3,705,365 | 12/1972 | Szabo et al. | 361/43 X |
| 3,974,345 | 8/1976 | Valfre | 333/216 X |
| 4,208,641 | 6/1980 | Suzuki | 333/217 |
| 4,264,940 | 4/1981 | Castle | 333/12 X |

FOREIGN PATENT DOCUMENTS 1765282  6/1980  Fed. Rep. of Germany.
381453  10/1932  United Kingdom.

OTHER PUBLICATIONS

Electronics-Circuit Designers Casebook-McGraw-Hill, p. 21.

Primary Examiner—A. D. Pellinen
Assistant Examiner—Todd E. DeBoer
Attorney, Agent, or Firm—John F. C. Glenn

[57] ABSTRACT

Shield of telecommunications cable is grounded through negative impedance converter to reduce induced voltage in conductors in the cable caused by electromagnetic field of nearby powerline.

3 Claims, 2 Drawing Figures

SHIELDED ELECTRICAL CABLE SYSTEM

BACKGROUND OF THE INVENTION

Power lines conventionally carry 60 Hertz alternating current which produces alternately increasing and collapsing magnetic fields, and thereby induces longitudinal 60 Hertz voltages and lower harmonics of these voltages in the conductors enclosed within telephone cables. This interferes with the signals carried by the conductors, and is becoming more and more of a problem with the changes resulting from growing use of electronic and digital switches in telephone systems.

Cable shielding as presently used is practically ineffective in reducing these induced voltages. Other remedial measures, such as neutralizing transformers, longitudinal chokes, and longitudinal drains, are very effective. However, their use on large cables, from 100 to 2100 pairs or larger, becomes very expensive because these devices operate on individual pairs of conductors in a cable, and it is necessary to treat every pair in the cable to produce the most satisfactory results.

SUMMARY OF THE INVENTION

In accordance with the present invention, the induced 60 Hertz and other harmonics of 60 Hertz voltages in telephone cable conductors are reduced by introducing a negative impedance in the cable shield circuit in such a manner that it will increase the induced current flowing in the cable shield. Such negative impedance is provided by a negative impedance converter, sometimes referred to as a negative impedance amplifier or repeater, or as a negative resistance converter, amplifier or repeater.

BRIEF DESCRIPTION OF THE DRAWING

The accompanying drawing schematically illustrates apparatus of the invention, as follows.

DETAILED DESCRIPTION OF PRESENT PREFERRED EMBODIMENT

Figure 1:
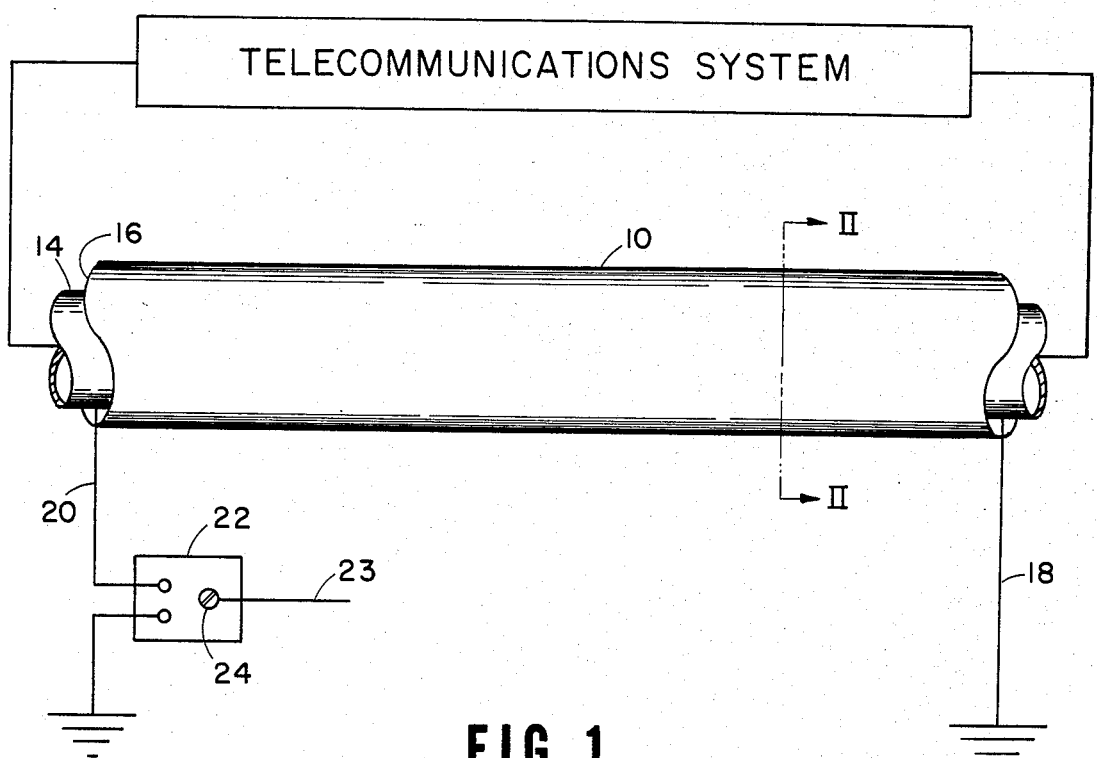
FIG. 1 is a view, partially broken away, showing schematically a length of telephone cable, ground connections with the shield in the cable; and a negative impedance converter in one of the ground connections.
Figure 2:
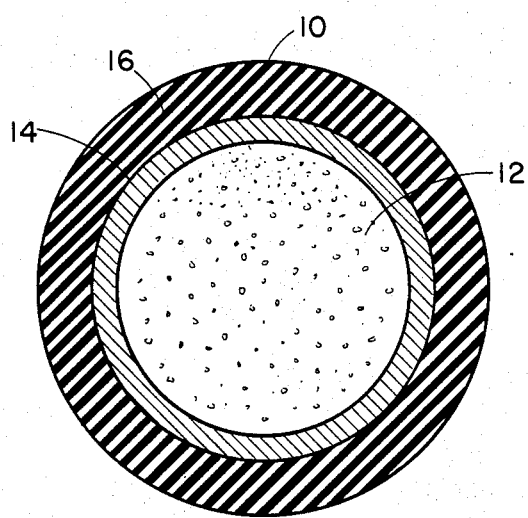
FIG. 2 shows a schematic section on line II—II in FIG. 1.

Referring now to the drawing, there is shown a telephone cable 10 which requires protection from the effects of the electromagnetic fields created by a nearby power line (not shown). The cable has a plurality of conventional internal conductors 12, and a surrounding shield 14 which in turn is surrounded by an outer layer of insulation 16. The shield 14 is a tube of conductive metal, such as aluminum or copper, and extends along the whole length of the cable.

The shield 14 is grounded through a connector 18 at one end of the length of the cable 10 which requires such protection. At the other end of this length of cable the shield 14 is grounded by a connector 20 through a negative impedance converter 22. Such grounding is to a very low impedance ground, such as a multi-grounded power line neutral. A line 23 connects converter 22 to an AC power source (not shown).

The negative impedance of the converter 22 is adjusted by control means 24 to a value nearly equal to the sum of the positive impedances of the shield 14 between connectors 18 and 20, and the impedance of the connectors 18 and 20 themselves (as determined when the converter 22 is disconnected but connector 20 remains grounded). When this is done the power line-induced voltage to ground of the conductors 12 between the connectors 18 and 20 is reduced to practically zero.

When this adjustment is made the shielding effect of shield 14 between connectors 18 and 20 is increased to substantially maximum extent, as shown by consideration of the following conventionally accepted equations.

The effectiveness of shielding conductors for preventing voltages from being induced in other conductors exposed to the same electromagnetic field or fields is given by the equation:

$$N = \frac{R_{22} + \frac{R_T}{L}}{R_{22} + Z_{22}^o + \frac{R_T}{L}} \qquad (1)$$

where:
N = the shield factor.
$R_{22}$ = resistance of the shield per kilofoot.
$R_T$ = the sum of the resistances of the two ground connections at the end of the shield.
L = length of the shield in kilofeet.
$Z_{22}^o$ = impedance of the shield circuit external to the shield.

The shield factor N is used to determine the amount of reduction obtained in the voltage induced in a conductor by the introduction of a shield into the electromagnetic field surrounding the conductor and the shield. This may be expressed by the following equation:

$$V_r = N V_I \qquad (2)$$

where:
$V_r$ = voltage remaining after the shield was introduced.
$V_I$ = voltage induced in the conductor before the shield was introduced.
N = shield factor.

It can be seen from the second equation that a shield factor of 1 would indicate no effect from the shield, whereas a shield factor of 0 would indicate perfect shielding as the voltage remaining ($V_r$) would be reduced to zero.

Examination of Equation (1) shows that the shield factor can be reduced to zero by adding a negative resistance to the numerator of the fraction on the right hand side of the equation. The value of this negative resistance would be $$-\left(R_{22} + \frac{R_T}{L}\right)$$

and this can be produced by a negative impedance converter as described above.

The operation of the invention in reducing the level of induced voltage in communication cable has been demonstrated in a field trial of cable connected at one end to the telephone exchange central office at Concord, Tenn. The 2400 pair cable extended south 0.8 miles from the central office in a buried conduit. There it divided into an east branch and a west branch, each having 1200 pairs of conductors. The east branch extended two miles east along one side of North Shore Drive to Blue Grass Road and 1.8 miles of this extension was buried about three feet deep, without a conduit, along one side of North Shore Drive, while an overhead power line extended along the other side of the Drive.

A shield extended continuously around the cable from the central office to the juncture with the branches, and that shield was connected to the shield around the two mile extension of the east branch. For purposes of the test these shields were disconnected from the shield around the west branch of the cable. The shields were grounded at the central office and at the far end of the two-mile extension of the east branch, and all intermediate groundings of the shields were disconnected for purposes of the test.

A spectrum analyzer was connected to a conductor in the cable at the central office, and two sets of readings of voltage between the conductor and the ground were taken. One set of readings was taken without connecting a negative impedance converter to any part of the circuit in question. The other set of readings was taken while a negative impedance converter was connected to the ground connection of the shield at the central office (in the manner described above in connection with converter 22). These readings were as follows:

| Frequency Hz | A Volts to Ground Without Converter | B Volts to Ground With Converter | C Reduction in Induced Voltage (A minus B = C) | D Percentage Dropped in Induced Voltage (C/A) |
|---|---|---|---|---|
| 60 | 9.8 | 1.4 | 8.4 | 86% |
| 180 | 14 | 1.7 | 12.3 | 88% |
| 300 | 7 | 1.1 | 5.9 | 84% |
| 420 | 0.55 | 0.11 | 0.44 | 80% |
| 540 | 0.31 | 0.05 | 0.26 | 84% |
| 660 | 0.05 | 0.005 | 0.045 | 90% |
| 740 | 0.06 | 0.015 | 0.045 | 75% |
| 900 | 0.03 | 0.012 | 0.018 | 60% |
| 1020 | 0.012 | 0.003 | 0.009 | 75% |

The converter used for the test was obtained from Tecron/Crown International, Inc. of Elkhart, Ind. which supplies relatively high powered impedance converters for loudspeakers used at public gatherings. The test converter operated at about 90 watts output during the test, and was connected to receive a power input to the converter of about 617 watts.

The column A readings shown above were within the 30 volt limit set by Rural Electrification Administration for an acceptable degree of induced voltage interference with communication cables by power lines. However, the same communication cables covered by the test has generated induced voltages higher than the 30 volt limit, and the converter used in the reported tests is effective to reduce such higher induced voltages far below the legally required volt limit.

It will thus be seen that applicant's system has significant useful applications. It has many advantages, including the following:

(1) It can reduce electromagnetic induced voltages in conductors in shielded communication cables to an acceptable level;

(2) Only the shield of the cable requires connections, instead of having to make connections to all pairs in the cable when other methods of mitigation are used;

(3) It has a cost advantage of at least 5 to 1 when used for cables of 900 pairs or over, as compared with other methods of mitigation;

(4) The fact that only the ends of the cable shield are to be grounded makes it easy to provide an alarm to operate when there is any failure of continuity of the shield between the grounded ends, an advantage which other mitigation methods fail to provide.

While preferred means and methods of practicing the invention have been illustrated and described, it will be understood that it may otherwise be variously practiced and embodied within the scope of the following claims.

I claim:

1. In a shielded electrical cable system, a length of a cable having a plurality of internal conductors and a surrounding metal shield, means to induce negative impedance, means connecting one end of the shield in said length of cable through said negative impedance means to ground, and means for connecting to ground the other end of the shield in said length of cable, said negative impedance means having a negative impedance substantially equal to the electrical resistance along the length of the shield between said ground connections, plus the electrical resistances along the lengths of said connections from shield to ground, whereby conductors in said length of cable are substantially shielded from any voltage inducing effect of electromagnetic fields of any adjacent power line carrying alternating current.

2. A system according to claim 1, in which the system is a telecommunications system.

3. A system according to claim 1, in which said negative impedance means is adjustable.

* * * * *